(No Model.)
J. RIDGE.
SPRING TIRE FOR VEHICLE WHEELS.
No. 573,921. Patented Dec. 29, 1896.
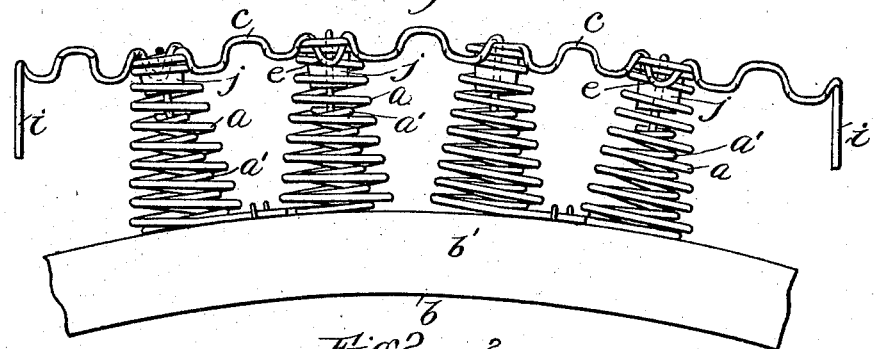
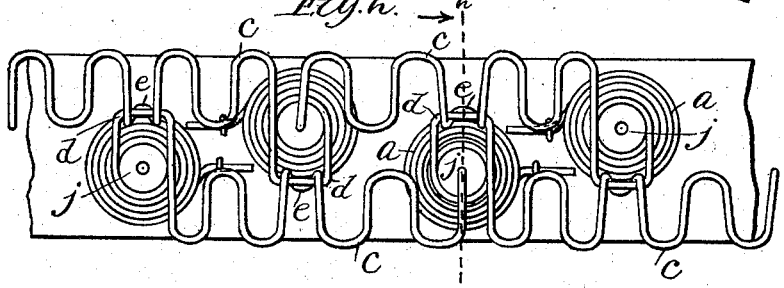
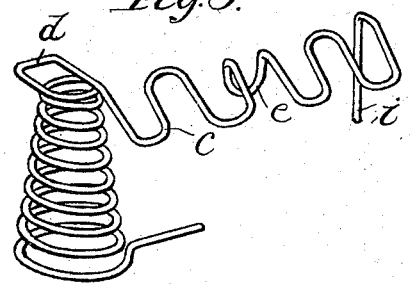
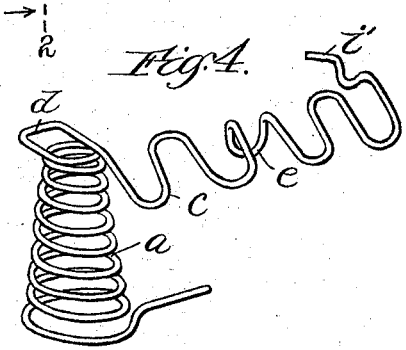
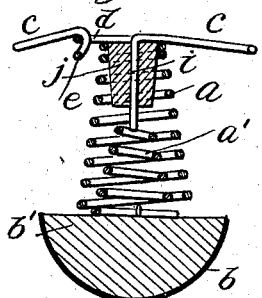
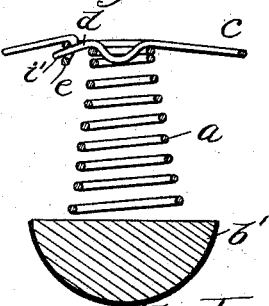
Witnesses.
Inventor.
Joseph Ridge

UNITED STATES PATENT OFFICE.

JOSEPH RIDGE, OF CHICAGO, ILLINOIS.

SPRING-TIRE FOR VEHICLE-WHEELS.

SPECIFICATION forming part of Letters Patent No. 573,921, dated December 29, 1896.

Application filed January 2, 1894. Serial No. 495,377. (No model.)

*To all whom it may concern:*

Be it known that I, JOSEPH RIDGE, of Chicago, county of Cook, and State of Illinois, have invented new and useful Improvements in Spring-Tires for Vehicle-Wheels, of which the following is a complete specification, reference being had to the accompanying drawings, in which—

Figure 1 is a circumferential segment showing the springs in side elevation. Fig. 2 is a plan view of the same. Figs. 3 and 4 each show a spring in perspective. Figs. 5 and 6 show transverse sections.

The purpose of my invention is to provide the most desirable structure of metal for spring-tire wherein durability and lightness are obtained and at the same time such construction and arrangement of springs are made as will serve in keeping the tire structure in position.

To obtain the desired lightness in metallic springs that will withstand the severe strain to which they are often subjected in this connection, I find that a small-size steel wire with a greater number of springs answers a better purpose than a heavier-gage wire. The form of spring is preferably spiral or helical, and so applied that the longitudinal axes of said springs are radial of the wheel. A single alinement of such springs around the wheel-rim admits of too great lateral flexion and necessitates a provision that will restrict such movement. For the purpose of meeting this requirement I stagger the springs with relation to each other, as hereinafter set forth.

With reference to the drawings the individual springs are lettered $a$, which in the present example are secured to the rim, the latter being composed of a concave metallic shell $b$ and an interior wooden layer $b'$, to which layer the springs are secured by staples. An arrangement of the springs with relation to each other is shown in Fig. 2. By placing them in double alinement, or with their axes on opposite sides of a circumferential line, the desired bracing or restraint is effected when the springs are properly secured together. Greater compactness, with consequent uniformity of spring action, may also thus be obtained.

The cushion structure of which the springs $a$ are the base is surmounted with a tread portion of skeleton formation, by which the spiral springs are connected together throughout the circumference of the wheel. This tread portion I preferably construct of extensions $c$, that are a continuation of the wire from each of springs $a$. This, as shown, is of zigzag or serpentine formation, the loops extending laterally beyond the tops of the springs to give suitable width to the tread. The first bend at the top of the spring of this outer structure forms a loop $d$, projecting inwardly. Centrally of the extension a loop $e$ is bent to hook shape. Thus, by reversing springs, hook $e$, when springs are alternated, is in position to engage with loop $d$. The terminal $i$ of extension $c$, in one form I have shown, is adapted to extend inwardly and into the adjacent spring on its side of the structure. Thus the springs, of which one is a counterpart of the others, advance in opposite directions in the order of their pairing or matching.

In Figs. 1 and 5 is shown a supplemental spring $a'$, that is located within the spring $a$. This I design, if desirable, to use as an auxiliary to further increase compactness and uniformity of action, and also it may be used to graduate the elastic resistance, thereby adapting the cushion to variation in the weight carried.

When the terminal $i$ is bent inwardly, a bushing $j$ is inserted in the outer end of spring $a$, centrally through which said terminal is inserted. The inner spring $a'$ is sufficiently less in diameter than spring $a$ to avoid contact of the two, and is secured at the base and outer end so that flexion conjointly with the outer spring is insured. In the present example the outer end is controlled by the extremity of terminal $i$, into which the latter is inserted.

In Figs. 4 and 6 is shown a terminal $i$, that is designed as an effective means of securing the parts together when no inner spring is used. In this form a depression or curve of the end rests in the open top of the spring, and the extremity is inserted through and between loop $d$ and hook $e$.

I am aware that reinforcing-springs to meet certain requirements are not new. In my invention the concentric springs, by reason of the double metallic wall, besides giving additional spring strength, give also greater resistance to the lateral displacement or flexion of the spring structure than when an equal weight of metal is used without concentric arrangement.

Having thus fully described my said invention, what I claim, and desire to secure by Letters Patent, is—

1. In a spring-tire, the combination with the rim of a vehicle-wheel, of a series of helical springs externally of said rim, in double alinement, or staggered, and a peripheral structure that connects one spring with another of the series at their outer ends.

2. In a spring-tire, the combination with the rim of a vehicle-wheel, of a series of helical springs externally of said rim, in double alinement, or staggered, a series of supplemental helical springs respectively concentric with the primary springs, and a peripheral structure that connects one spring with another of the succession at their outer ends.

3. In a vehicle-wheel, and in combination with the rim thereof, a series of coiled springs $a$ with an outer tread structure $c$, a spring and section of tread structure being formed of a single piece of wire, substantially as set forth.

4. In a vehicle-wheel, and in combination with the rim thereof, a spring $a$ and tread portion $c$, composed of a single piece of wire and applied conjointly with counterparts to form a continuous cushion, substantially as set forth.

5. The spring $a$, with the angularly-emanating sinuous extension $c$ in counterpart and alternating series, interlocked and mounted about the rim of a vehicle-wheel, substantially as specified.

JOSEPH RIDGE.

Witnesses:
M. A. MORRIS,
E. H. KOENIG.